May 15, 1951    J. A. STRIMPLE ET AL    2,552,747
CENTRIFUGAL SELF-ENERGIZING CLUTCH
Filed Dec. 18, 1946
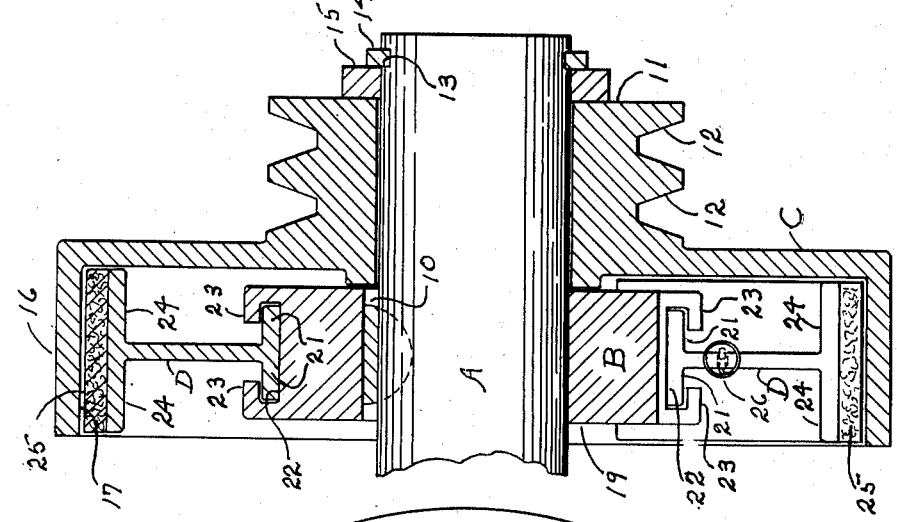
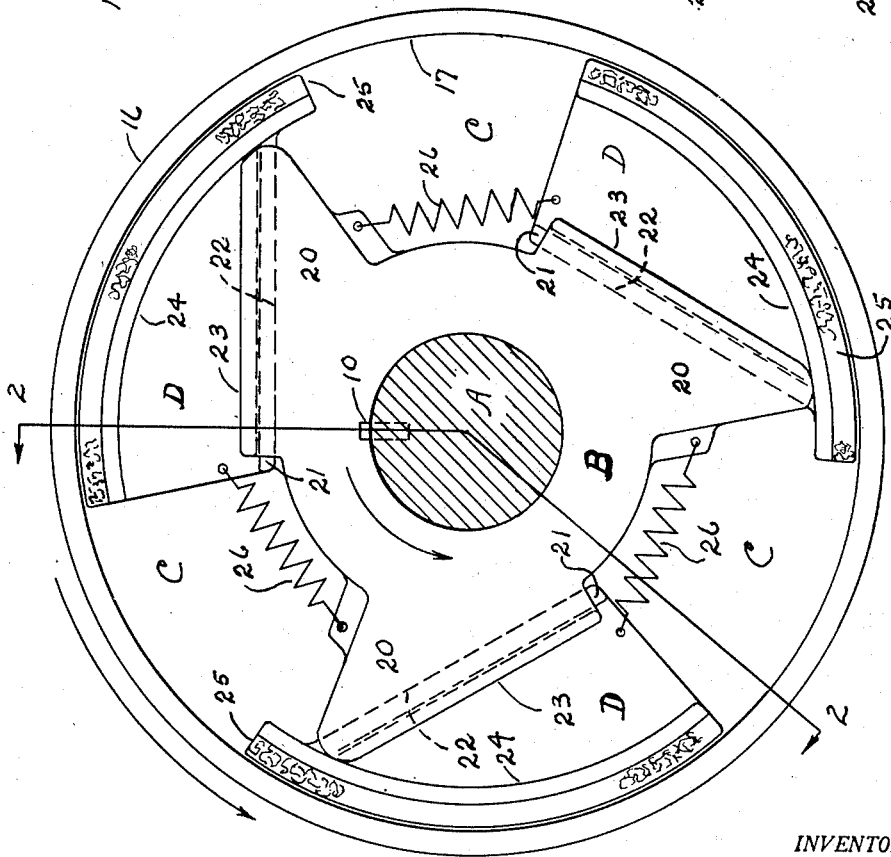
INVENTOR.
JOHN A STRIMPLE
LOUIS M JOHNSON
BY
ATTORNEY Patented May 15, 1951

2,552,747

UNITED STATES PATENT OFFICE 2,552,747

CENTRIFUGAL SELF-ENERGIZING CLUTCH

John A. Strimple, Janesville, and Louis M. Johnson, Fond du Lac, Wis., assignors to J. A. Strimple Company, Inc., Janesville, Wis., a corporation of Wisconsin Application December 18, 1946, Serial No. 716,962

1 Claim. (Cl. 192—105)

The present invention relates to a centrifugal and self-energizing clutch particularly adapted for use for driving scooters, cars, motorcycles, tricycles and the like, wherein, there is no other connection or transmission provided between the engine and driving wheels. The primary object of the present invention is to provide a clutch which engages and disengages automatically, the engaging and disengaging being determined by the speed of the engine whereby all that the driver of the vehicle has to do for operating the vehicle is to control the speed of the engine.

An object of the present invention is to provide a clutch which will be automatically disengaged when the engine is reduced to an idling speed, the idling speed being determined by an adjustable screw or the like so the driver of the vehicle simply moves the throttle controlling lever to the "off" position for stopping the vehicle.

Clearly therefore to start the car in motion all the operator has to do is to simply open the throttle and immediately the speed of the engine is increased slightly and centrifugal force will cause the clutch to be engaged.

We provide additional means for finally engaging the clutch to a point where it will not slip by means of the torque or power required to move the vehicle.

It will be understood that scooter cars are especially driven by boys and girls. It is therefore an object of the present invention to provide a clutch which is positive in its operation, simple in its construction and not apt to get out of order.

To these and other useful ends our invention consists of parts, combinations of parts or their equivalents and mode of operation as hereinafter described and claimed and shown in the accompanying drawings in which:

Fig. 1 is an end view of our improved automatic centrifugal clutch.

Fig. 2 is a transverse sectional view taken on line 2—2 of Figure 1.

As thus illustrated the engine or driving shaft is designated by reference character A. The driving unit is designated in its entirety by reference character B. The driven member in its entirety is designated by reference character C.

Member B is keyed to shaft A as at 10, member C has a hub 11 which is rotatably mounted on shaft A having means for driving a driven member. In the present design we provide preferably two V-shaped grooves 12—12 for V-driving belts. Member 11 is held on shaft A as follows:

A groove 13 is provided in the shaft for the reception of a snap ring 14, and between members 11 and 14 a collar 15 is provided. Member C is provided with a flange 16, the inner surface of which is machine trued as at 17. Member B comprises a hub 19 having preferably, three projections 20 which are machine trued at an angle to the radius as illustrated in the figures, to a surface 22 having over hanging flanges 23—23 forming a slideway or T-shaped slot for flanges 21—21 on members D which is the clutch shoe engaging member.

These flanges form a T-shaped member which is slidably mounted on surface 22 and under flanges 23 or in the guiding slot. The shape of members D is clearly shown in the figures, on the outer edge of which are provided flanges 24—24. On these flanges we secure suitable friction surface or strips 25, preferably made from treated fabric so they may act as a friction means when pressed against surface 17. A pull spring 26 is secured to members D and 20 as illustrated, having a pulling strength capable of holding members D in the position shown so members 25 are out of contact with surface 17 when shaft A is turned at engine idling speed. Generally this shaft is the protruding end of the crank shaft of an internal combustion engine, the throttle of which is adjusted to maintain an idling speed. Therefore when the operator closes the engine throttle as far as it will go the engine will continue to turn at a predetermined speed and with the clutch disengaged.

It will be noted that members D move outward and rearward, the shaft being turned in the direction of the inner curvilinear arrow in Figure 1. Clearly therefore as the engine speed increases and the speed of the car is increased the frictional contact between members 25 and surface 17 will be increased to an extent which an ordinary driving speed will prevent slippage because of the torque or power delivered to driver B.

It will be seen that when the engine speed is reduced considerably or when the engine speed approaches idling speed, member C will be inclined to travel faster than member B in the direction of the outer curvilinear arrow and will act to move members D forward thus to insure breaking of contact between members 25 and surface 17, and then permit springs 26 to hold members D out of contact with surface 17 so long as the engine is idling. The strength of the spring therefore, determines the maximum idling speed.

It will be understood from an inspection of Figure 2 that the flanges 21 forming a part of the T-shaped member extend a considerable distance outwardly of each side thereof to provide a relatively wide cross head with the associated slot also so formed to provide increased breadth or width and eliminate transverse tilting of the shoes in the slots. Also, in Figure 1, the T-shaped members are longer than the slots and while these members slide in the slots the relative lengths are such that the members project from opposite ends of the slots irrespective of the active and inactive positions of the brake shoes. The specific relationship of the T-shaped members and slots eliminates longitudinal or circumferential tilting of the shoes which results in a more sensitive action of the shoes responsive to torque activities. It will be further noted that the T-shaped members have a snug fit in the slots and there is an even wear over all surfaces.

Attention is called to the fact that the weight of members D and change in speed of member B cooperate with centrifugal force to cause clutch members D to respond perfectly under all conditions. For example, when the operator wishes to start his car the speed of the engine is increased and because of the weight of members D, member B will be inclined to travel faster than members D, thus to cause members D to slide rearwardly and outwardly; and by the same sign when the operator closes the engine throttle, members D will travel forward because of their weight in the direction they are pulled by the spring so as to cooperate therewith. At the same time a tendency of the car to travel faster than the engine after the throttle is closed will tend to assist members D to breaking contact with surface 17.

Thus clearly applicants' device is ideally adapted for use on scooter cars, tricycles and the like, wherein all the operator has to do is to control the engine speed. The clutch will do the rest, thus making the vehicle easy to handle.

Having thus shown and described our invention we claim:

A clutch of the character described comprising in combination, a driving shaft having a hub rigidly secured thereto, a driven member rotatably mounted on said shaft and having a flange which surrounds the hub, there being a number of straight peripherally spaced T-shaped guiding slots in said hub positioned at an angle outwardly and rearwardly from the direction of rotation, clutching shoes having T-shaped members slidably mounted in said T-shaped slots, said T-shaped members being of a length to extend from opposite ends of the slots irrespective of the activity and inactivity positions of the clutching shoes and snugly fitting said slots and preventing longitudinal tilting of the shoes in said slots, said slots and T-shaped members also being of a width for preventing transverse tilting of the shoes in said slots, said clutching shoes having a friction surface on their outer sides adapted to engage the inner surface of said flange, springs operatively connected between said hub and clutching shoes adapted to prevent contact by centrifugal force of said friction surfaces with said flange when said driving member is turning below a predetermined speed, the angle of said T-shaped slots adapted to cooperate with said centrifugal force to move said clutching shoes outwardly by torque.

JOHN A. STRIMPLE.
LOUIS M. JOHNSON.

REFERENCES CITED

The following references are of record in the file of this patent:

UNITED STATES PATENTS

| Number | Name | Date |
|---|---|---|
| 1,032,524 | Wiard | July 16, 1912 |
| 1,077,728 | Mann | Nov. 4, 1913 |
| 1,303,734 | Smythe | May 13, 1919 |
| 1,391,798 | Seib | Sept. 27, 1921 |
| 1,841,612 | Leyner | Jan. 19, 1932 |
| 1,868,245 | Obermoser | July 19, 1932 |
| 2,087,968 | Dodge | July 27, 1937 |
| 2,158,544 | Keller | May 16, 1939 |
| 2,343,312 | Maurer | Mar. 7, 1944 |
| 2,375,909 | Fawick | May 15, 1945 |

FOREIGN PATENTS

| Number | Country | Date |
|---|---|---|
| 189,051 | Great Britain | Nov. 23, 1932 |
| 737,802 | France | Dec. 16, 1932 |